(12) United States Patent  (10) Patent No.: US 9,374,460 B2
Nath et al.  (45) Date of Patent: Jun. 21, 2016

(54) SYSTEM AND METHOD FOR DETECTING CALL-THROUGH EVENTS FOR ADVERTISING IMPRESSIONS SENT TO MOBILE WIRELESS DEVICES

(75) Inventors: Badri Nath, Edison, NJ (US); Rakesh Kushwaha, Marlboro, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 2079 days.

(21) Appl. No.: 12/164,865

(22) Filed: Jun. 30, 2008

(65) Prior Publication Data
US 2009/0325547 A1 Dec. 31, 2009

(51) Int. Cl.
| | |
|---|---|
| *H04M 1/00* | (2006.01) |
| *H04M 3/487* | (2006.01) |
| *G06Q 10/06* | (2012.01) |
| *G06Q 30/02* | (2012.01) |
| *H04M 1/56* | (2006.01) |
| *H04M 1/2745* | (2006.01) |

(52) U.S. Cl.
CPC ......... *H04M 3/4878* (2013.01); *G06Q 10/0637* (2013.01); *G06Q 30/02* (2013.01); *H04M 1/56* (2013.01); *H04M 1/274516* (2013.01); *H04M 2250/60* (2013.01)

(58) Field of Classification Search
CPC ................ H04M 3/4878; H04M 1/56; H04M 1/274516; H04M 2250/60; G06Q 10/0637; G06Q 30/02
USPC ............. 455/403, 404.1, 404.2, 412.1, 412.2, 455/414.1, 414.2, 445, 415, 427, 432.3, 455/414.3; 705/14.4–14.73, 14.64
See application file for complete search history.

(56) References Cited

U.S. PATENT DOCUMENTS

| | | | |
|---|---|---|---|
| 5,937,390 A | 8/1999 | Hyodo | |
| 2003/0046161 A1 | 3/2003 | Kamangar et al. | |
| 2004/0097244 A1* | 5/2004 | Yamazaki et al. | 455/456.3 |
| 2004/0266397 A1* | 12/2004 | Smith et al. | 455/412.1 |
| 2005/0177419 A1 | 8/2005 | Choi et al. | |
| 2006/0259365 A1 | 11/2006 | Agarwal et al. | |
| 2006/0270421 A1* | 11/2006 | Phillips et al. | 455/457 |
| 2008/0215429 A1* | 9/2008 | Ramer et al. | 705/14 |
| 2008/0305775 A1* | 12/2008 | Aaltonen et al. | 455/412.1 |
| 2008/0318559 A1* | 12/2008 | Porco | 455/414.2 |
| 2009/0055270 A1* | 2/2009 | Magdon-Ismail et al. | 705/14 |
| 2009/0198579 A1* | 8/2009 | Lewis et al. | 705/14 |

* cited by examiner

*Primary Examiner* — Keith Fang
(74) *Attorney, Agent, or Firm* — Brosemer, Kolefas & Associates, LLC

(57) ABSTRACT

An arrangement is described for capturing and reporting call-through events in connection with phone numbers embedded in advertising impressions sent to mobile wireless devices. A call-through event is said to occur when a phone number embedded within an advertising impression is called from the mobile device. The system includes a call-through detector on the device that captures data related to a call-through event and communicates the captured data for one or more phone numbers over the network to a server. The server collects the captured data from various mobile devices and can correlate those with the advertisements sent to the mobile devices. A call detail information record sent from a device may contain detailed information about the context in which the call was made from the mobile device, including, for example, time of day or device location.

19 Claims, 5 Drawing Sheets

REQUIRED CALL DETAILED INFORMATION

| NUMBER | LOCATION | TIME | APP USAGE | POLICY | POLICY PARAMETERS |
|---|---|---|---|---|---|
| 2081256781 | N | Y | Y | PERIODIC | 8 HOURS |
| 8003251234 | Y | Y | Y | UPON DETECTION | |
| 8882124321 | Y | N | N | UPON REQUEST | |
| ... | | | | | |

*FIG. 4*

CALL DETAILED INFORMATION RECORD

| NUMBER | TIME | ACTIVE APPLICATIONS |
|---|---|---|
| 8003251234 | 8:03:04 | BROWSER, GOOGLEMAPS |
| 8882124321 | 6:04:05 | |
| 2081256781 | 5:45:05 | BROWSER, FACEBOOK |

OUTBOUND CALL LOG

| | | |
|---|---|---|
| ... | 2081256781 | 5:45:05 |
| | 2125551212 | 5:58:07 |
| | 8882124321 | 6:04:05 |
| ... | | |
| | 8003251234 | 8:03:04 |
| ... | | |

*FIG. 5*

SYSTEM AND METHOD FOR DETECTING CALL-THROUGH EVENTS FOR ADVERTISING IMPRESSIONS SENT TO MOBILE WIRELESS DEVICES

FIELD OF THE INVENTION

The present invention relates to mobile wireless communications, and more particularly to advertising or the like sent to mobile wireless communications devices.

BACKGROUND INFORMATION

The internet, or the world wide web, has become a powerful medium for selling goods and services. The internet provides access to content and e-commerce sites where people can obtain information about, see, and purchase goods and services. Typically, a user connects to various sites on the internet by knowing the address of the site or searching, with the help of search engines, for a site that offers what the user seeks. Many web pages that are displayed on the internet display one or more advertisements. The display of such advertisements is part of the business model of many web sites. Many business models on the world wide web such as content sites, search engines, social networks, and e-commerce sites rely on advertisements displayed alongside content on web pages.

Existing web sites often record information about the users who browse the site and several techniques exist for determining advertising metrics of on-line sites. Information about a user is often obtained through a state maintained in the client machine in the form of "cookies." Additional information such as request origination may be gathered, for example, by recording the IP address of the client as well as the web site from which the request is being originated.

When an advertising impression is shown as part of a web page and users respond to the advertisement by clicking on it, this event is referred to as a "click-through." The connection that is made when a click-through occurs can provide valuable feedback to the advertiser. The click-through provides information about the user who clicked on the advertising impression and the web site from which the connection is made. The success of the advertisement may be readily determined by studying the click-through data. Such data has been an effective measure to determine the impact of on-line advertising. However, when a user calls a phone number that is shown as part of an advertising impression instead of clicking on a link in the advertising impression, a click-through event does not occur and thus click-through data is not available.

With the advent of mobile wireless communications supporting data connectivity, mobile wireless devices are being used to browse the internet. The content displayed on mobile devices also show advertising impressions and users can click on the impressions just as they would when using desktop or laptop computers. However, given the relatively small size of the display of a mobile device and the frequently poor network performance due to high latency and low bandwidth, a mobile user does not typically browse for extended periods of time. In general, the user experience for browsing the internet from mobile wireless devices leaves something to be desired.

In spite of the poor user experience, however, the use of mobile devices for accessing the internet is growing. When content is displayed on the screen of a mobile wireless device, the user will often see advertising displayed alongside. Given that the mobile wireless device is primarily a phone, it is very likely that the device user will call a phone number displayed in an advertising impression rather than click on a link provided therein. In such a scenario, however, the web site that displayed the advertisement will not get the feedback that it would have otherwise gotten in the form of a click-through.

Hence, in order to measure the success of advertising impressions when users call phone numbers displayed therewith instead of clicking on the advertising impressions, there is a need to effectively measure the call-through rate from mobile wireless devices and provide it to the entity that sent the advertising impressions or is responsible for measuring advertising metrics.

SUMMARY OF THE INVENTION

The present invention generally relates to methods and apparatus for gathering and providing information that can be used in determining the success of advertising impressions sent to mobile wireless devices where instead of clicking-through on the advertising impressions, the users call phone numbers embedded in the advertising impressions.

In an exemplary embodiment, the present invention provides a means by which a calling event to a phone number can be correlated with the display of the phone number in an advertising impression. This is done with the use of a call-through detector operating on a wireless communications device which monitors the outbound calls from the device, detects calls to phone numbers of interest, and provides information about such calls to a centralized server or the like. The phone numbers of interest can be specified by the server and ostensibly are phone numbers that are embedded in advertising impressions sent to the device. The information provided by the call-through detector to the server can be matched with the phone numbers embedded in advertising impressions sent to the device, thereby providing an indication as to the effectiveness of such advertising impressions.

In a further exemplary embodiment, contextual information about outbound calls made to phone numbers of interest can also be gathered by the client software and provided to the server. Such information may include, for example, the time of day of the call, the location of the device when the call was made, the application through which the advertisement with the called number was displayed, and details of applications that were active at the time of or proximately to the placement of the call, among other items of information.

An exemplary call-through detector in accordance with the present invention performs the aforementioned information gathering and records it as part of a Call Detail Information Record (CDIR). The CDIR can be sent to a server where it can be processed and analyzed, along with CDIRs from multiple devices. The call-through detector can be implemented as client software running on the device. Preferably, the call-through detector is capable of establishing a session with a server.

In an exemplary embodiment, the call-through detector records the outbound call information from the device memory or from call records from a subscriber identity module (SIM), or the like, in the device. In either case, the information about the called phone numbers can be augmented with additional information relating to the call.

In an exemplary embodiment, a device is informed of the need to gather such information by means of a Required Call Detailed Information (RCDI) message. The RCDI message can be communicated by a server to the call-through detector on a device as part of a session that is established between the call-though detector and the server. A policy for how often or when to send a CDIR and/or what information to include therein can be specified as part of the RCDI message. The call-though detector can use the parameters of the policy to implement the mechanism for preparing and sending the CDIR back to the server.

A list of phone numbers for which call detail information is to be recorded can be provided to the server by an advertising entity, or the like, that sends advertising impressions to mobile devices or embeds phone numbers as part of advertising impressions.

The above and other aspects and features of the present invention will be apparent from the drawings and detailed description which follow.

BRIEF DESCRIPTION OF THE DRAWINGS

FIG. 4 is a table showing exemplary parameters specified in a Required Call Detailed Information (RCDI) message sent by a server to a mobile wireless device.

FIG. 5 shows an exemplary Call Detailed Information Record (CDIR) and the corresponding contents of an out-bound call log of a device.

DETAILED DESCRIPTION

Figure 1:
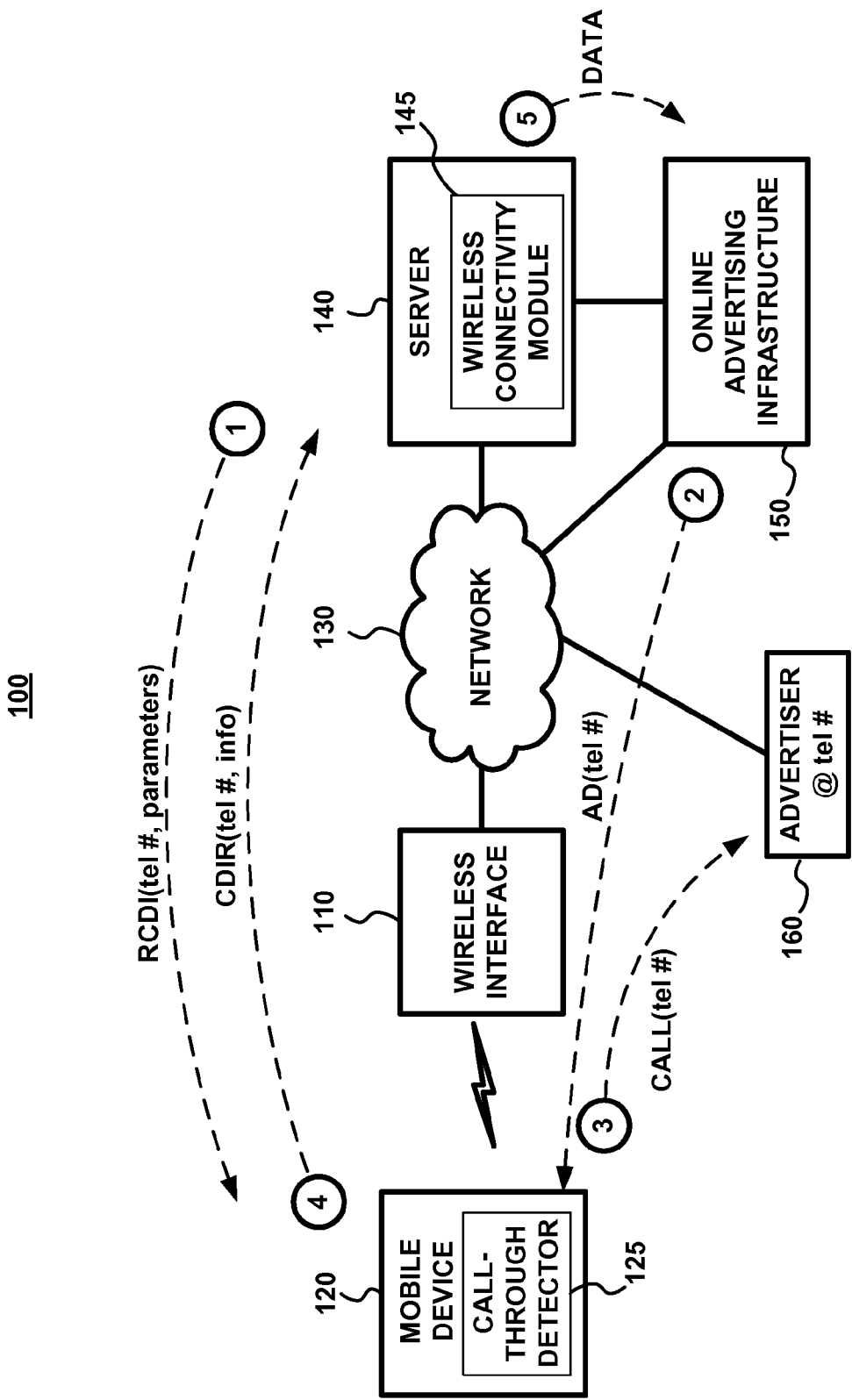
FIG. 1 is a block diagram of an exemplary system in which the present invention can be implemented.

FIG. 1 is a block diagram of an exemplary system 100 in which the present invention can be implemented. In the system 100, a mobile wireless device 120 communicates via some wireless interface 110 (e.g., base station, wireless LAN node, etc.) over a communications network 130. Examples of wireless communication links include but are not limited to GPRS, EVDO, WLAN, WiMAX, LTE, etc. The mobile wireless device 120 can support one or more of these communication bearers. Also coupled to the network 130 is a server 140, such as, for example, a device management server, a content server, or the like. The server 140 supports one or more wireless connectivity modules 145 allowing it to establish a data session with the mobile wireless device 120.

The mobile wireless device 120 is implemented with a call-through detector 125 in accordance with the present invention. The call-through detector 125 can be implemented, for example, as a program (e.g., software, firmware, plug-in) which executes on the mobile wireless device 120. The call-through detector 125 can communicate with the server 140 and engage in sessions therewith.

The server 140 also interacts with an online advertising infrastructure 150, which may include, for example, a network of content servers, websites, ad composition and delivery servers, and any or all elements involved in generating and providing advertisements to mobile wireless devices. The server 140 may itself be part of the advertising infrastructure 150 but is represented in FIG. 1 by its own block for generality.

An advertiser 160 is also shown coupled to the network 130. The advertiser 160, such as a vendor, for example, is associated with goods or services that are the subject of online advertisements. The advertiser 160 can be contacted such as by placing a voice call to a telephone number (tel #) embedded (e.g., displayed as content or in a link) in an online advertisement, or advertising impression.

FIG. 1 shows the interaction between the various system elements in accordance with an exemplary embodiment of the present invention. As represented by arrow 1, a Required Call Detailed Information (RCDI) message is sent from the server 140, via the network 130, to the mobile device 120. As described in greater detail below, the RCDI message instructs the call-through detector 125 of the device to perform call-through event recording for one or more advertisement telephone numbers in accordance with one or more parameters. Preferably, the server 140 and the device 120 are mutually authenticated before the RCDI message is sent. Authentication can be based on any suitable procedure such as the exchange of passwords or credentials that are mutually known to the server and the call-detector program.

At some later point in time, an online advertisement containing a telephone number of interest is sent to the device 120 from the advertising infrastructure 150, as represented by arrow 2. A call may be placed from the device 120 to the telephone number, as represented by arrow 3. The telephone number is associated with the advertiser 160 that is associated with the goods or services that are the subject of the online advertisement.

At some point, a call detailed information record (CDIR) is sent from the mobile device 120 to the server 140, as represented by arrow 4. The CDIR, described in greater detail below, contains call-through information pertaining to one or more telephone numbers for which the device has been instructed (via RCDI message from the server 140) to record such information. The CDIR may be sent regardless of whether a call-through event has occurred or may be sent only if a call-through event has occurred. As described below, the generation and sending of CDIRs can be carried out in accordance with parameters specified in an RCDI message.

As represented by arrow 5, the server 140 will provide call-through data or data derived therefrom to the online advertising infrastructure 150. This can be done, for example, once the server has compiled sufficient call-through data from mobile devices so as to allow a meaningful evaluation of the effectiveness of an online advertising campaign. The data can also be provided periodically, upon request, upon occurrence of an event or condition, or in accordance with any suitable arrangement.

Figure 2:
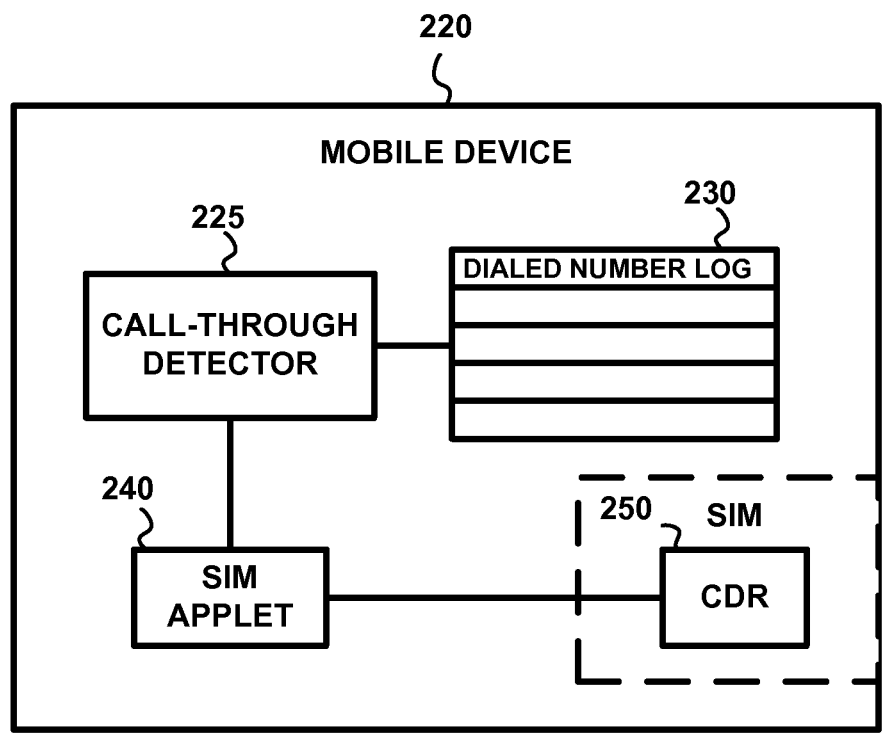
FIG. 2 is a schematic representation of a mobile wireless device comprising a call-through detector and one or more elements from which information about out-bound calls can potentially be obtained.

FIG. 2 is a schematic representation of a mobile wireless device 220 that supports one or more commonly known wireless bearers. A wireless bearer allows the mobile wireless device to communicate with the network using voice or data connections.

The device 220 is implemented with a call-through detector 225. A function of the call-through detector 225 is to determine a list of out-bound calls made from the wireless device 220. The call-through detector 225 can obtain this information in several ways, including reading a data store on the device 220 such as call logs that are typically found in many wireless devices. A typical call log stores a list of numbers such as missed calls, received calls, and dialed calls. Of interest to the call-through detector 225 are the dialed calls, which are logged in a dialed number log 230.

Another way that the call-through detector 225 can obtain information about out-bound calls is to interact with a Subscriber Identity Module (SIM) applet 240 found on many mobile wireless devices which records call activity of the device and generates a call detail record (CDR) 250. In an exemplary embodiment, the call-through detector 225 interacts with the SIM applet 240 to obtain out-bound call information.

From the out-bound call information, the call-through detector 225 determines whether any calls were made to any telephone numbers of interest, namely, those numbers for which the call-through detector has been directed, in an RCDI message, to perform call-through event recording. If so, the call-through detector 225 may also collect any contextual information specified in the RCDI message.

Figure 3:
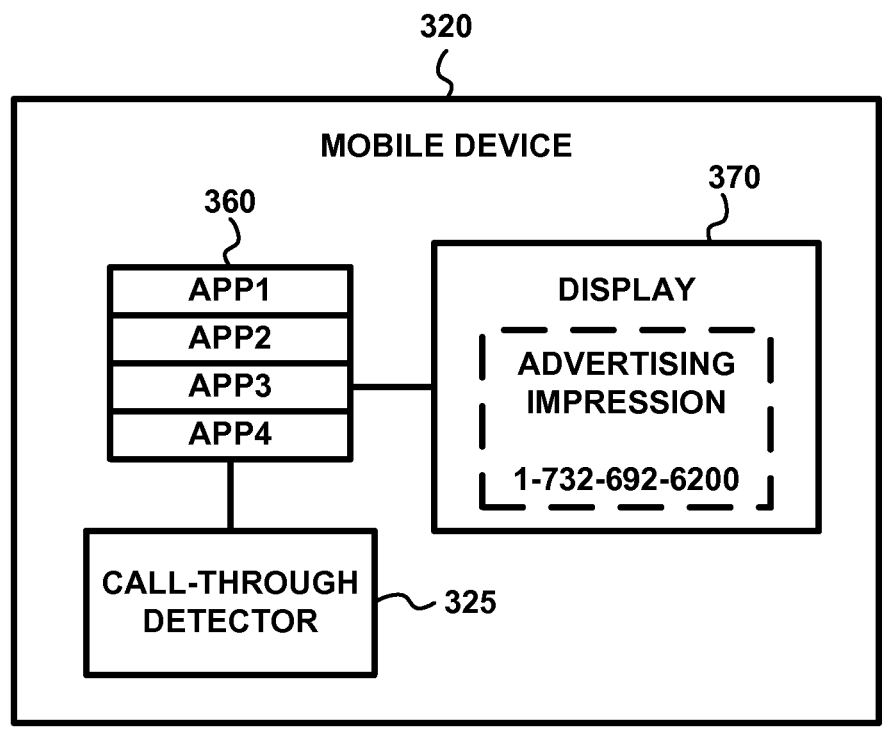
FIG. 3 is an illustration of a mobile wireless device comprising a display with an advertising impression containing a phone number displayed thereon.

An item of contextual information that may be gathered by the call-through detector 225 includes a listing of applications that are actively running on the device at the time a call is placed to a telephone number of interest. FIG. 3 is a schematic representation of a mobile wireless device 320 having several applications (APP1-APP4) installed thereon (e.g., in memory 360), and implemented with a call-through detector 325 in accordance with the present invention. In FIG. 3, APP3 is active and is displaying an advertisement with a phone number on the device's display 370.

If the call-through detector 325 has received an RCDI message for a phone number of interest, and the call-through detector determines that a call has been placed from the device to that phone number (e.g., the phone number is on an outbound call log), then the call-through detector 325 sends the outbound call number in a CDIR to the server 140, in accordance with the parameters specified in the RCDI message. If the RCDI message specifies that application usage is to be tracked for the called number, the call-through detector 325 also sends the identities of active applications in the CDIR. Information regarding which applications are active can be obtained by the call-through detector via an application programming interface (API) provided by the operating system. Additional information regarding such applications (e.g., version, author) may also be collected and provided in the CDIR.

An application that will typically be active when a call-through event occurs will be a web browser. In addition, an application for interacting with a particular web site (e.g., Facebook, Googlemaps) may also be active. In the scenario of FIG. 3, for example, APP3, an application displaying an advertising impression with a phone number of interest, would be reported as active, assuming the call is placed while the phone number is being displayed. Typically there will also be other applications that may be unrelated to the display of advertisements and telephone numbers contained therein. Whether or not the call-through detector 325 will report such applications may, for example, be specified in the RCDI message, or may follow a predetermined policy for reporting such applications.

It is possible that a user will call a telephone number displayed in an advertising impression after the number ceases to be displayed. In that case, the applications that are active at the time of the call may be irrelevant to the display of the number that was called. To address this issue, in an exemplary embodiment, the call-through detector 325 can maintain and report a list of those applications that were active at any point within a window of time (e.g., 0-30 minutes) prior to a call-through event. The size of the window can be predetermined or specified in an RCDI message, for example.

FIG. 4 shows an exemplary content of a Required Call Detailed Information (RCDI) message that may be sent from a server to a device. The RCDI message includes a list of phone numbers about which information is desired. Associated with each of the listed phone numbers are one or more options or parameters regarding the information that is to be collected in connection with each number. Alternatively, one set of parameters can be specified for all listed phone numbers, categories of numbers, or any subset of numbers. For example, Boolean flags (e.g., Yes/No) may be used to specify what information is to be collected by the device. Such information may include, for example, device location, time of call, whether the device was roaming or at home, type of coverage (e.g., 2G, 3G), and application status, among other possibilities. Policy on when and how to send a CDIR may also be specified in the RCDI message. The call-through detector uses the parameters in the policy to implement the desired way of sending back to the server the call detailed information. In the example shown, a CDIR for the first number will be sent periodically, once every eight hours. Alternatively, a CDIR can be sent, for example, upon the detection of a call-through event, or upon request, among other possibilities.

A CDIR can be sent for each advertisement number of interest or for a plurality of numbers. Also, whether a CDIR is sent can be conditioned on whether a call-through event has been detected or whether a threshold number of call-through events have been detected. Alternatively, a CDIR can be sent periodically regardless of whether a call-through event has occurred. A CDIR can also be sent in response to a request from the server.

The time of a call can be determined by the call-through detector from a variety of sources, including, for example, the call data record stored in the device memory, the call data record stored in the SIM, or by reading the device clock when the call occurs.

Device location can also be determined by the call-through detector in a variety of ways. For example, the call-through detector can read cell-identifier information that is conventionally available on the mobile device. If the device has global positioning system (GPS) capability or is coupled to a GPS device, an API for the GPS can be provided from which the call-through detector can obtain the location information.

In a further exemplary embodiment, RCDI messages may be sent to the device from multiple servers, or the device may be required to send CDIRs to multiple servers. In that case, an RCDI message may also preferably specify where (e.g., IP address) a CDIR for one or more phone numbers is to be sent.

FIG. 5 shows an exemplary content of a Call Detailed Information Record (CDIR) generated by the call-through detector. The exemplary CDIR shown contains information about three numbers in the outbound call log that match numbers in an RCDI message received by the device. In the example shown, the time of call and a listing of active applications are reported for each number.

Using the information in the CDIR(s) received from one or more devices, the server can effectively determine the call-through rate or other useful metrics for individual or multiple advertisements.

It is understood that the above-described embodiments are illustrative of only a few of the possible specific embodiments which can represent applications of the present invention. Numerous and varied other arrangements can be made by those skilled in the art without departing from the spirit and scope of the invention.

What is claimed is:

1. A method for capturing and reporting call-through events on a mobile wireless device comprising the steps of:
receiving at the mobile wireless device a first message sent from a server specifying call-through event information to be collected at the mobile wireless device for an advertising phone number, the call-through event information including at least one of a time, a location of the mobile wireless device, and an application status;
receiving at the mobile wireless device an advertising impression with the advertising phone number;
displaying the advertising impression with the advertising phone number;

originating a call from the mobile wireless device to the advertising phone number, thereby causing a call-through event;

collecting at the mobile wireless device the call-through event information for the call; and sending a second message from the mobile wireless device containing the call-through event information.

2. The method of claim 1, wherein the first message specifies when to send the second message and the second message is sent in accordance with the first message.

3. The method of claim 1, wherein the first message is sent from an authorized server and the second message is sent to the authorized server.

4. The method of claim 3 comprising mutually authenticating the server and the mobile wireless device.

5. The method of claim 1, wherein collecting the call-through event information includes reading a call detail record from a memory of the mobile wireless device.

6. The method of claim 1, wherein collecting the call-through event information includes reading a call detail record from a subscriber identity module of the mobile wireless device.

7. The method of claim 1, wherein collecting the call-through event information includes determining the time from at least one of a call data record stored in a memory of the mobile wireless device, a call data record stored in a subscriber identity module, and a clock of the mobile wireless device.

8. The method of claim 1, wherein collecting the call-through event information includes determining the location of the mobile wireless device from at least one of a cell identifier, and a source of global positioning system coordinates.

9. The method of claim 1, wherein collecting the call-through event information includes determining the application status, the application status including an indication of which applications were active when originating the call to the advertising phone number.

10. The method of claim 1, wherein collecting the call-through event information includes determining the application status, the application status including an indication of which applications were active in a time period preceding originating the call to the advertising phone number.

11. The method of claim 2, wherein the second message is sent in accordance with a policy selected from the group of policies consisting of:

periodically at a predetermined interval;

periodically at a predetermined interval, provided at least one call-through event has been detected;

after a predetermined number of call-through events have been detected; and in response to a request.

12. A method for capturing and reporting call-through events on a mobile wireless device comprising the steps of:

sending to the mobile wireless device a first message from a server specifying call-through event information to be collected at the mobile wireless device for an advertising phone number, the call-through event information including at least one of a time, a location of the mobile wireless device, and an application status;

sending to the mobile wireless device an advertising impression with the advertising phone number for display by the mobile wireless device; and receiving from the mobile wireless device a second message containing the call-through event information, wherein the call-through event information is collected at the mobile wireless device for a call originating from the mobile wireless device to the advertising phone number.

13. The method of claim 12, wherein the first message specifies when to send the second message and the second message is sent in accordance with the first message.

14. The method of claim 12, wherein the first message is sent from an authorized server and the second message is sent to the authorized server.

15. The method of claim 14 comprising mutually authenticating the server and the mobile wireless device.

16. The method of claim 12, wherein the application status includes an indication of which applications were active when originating the call to the advertising phone number.

17. The method of claim 12, wherein the application status includes an indication of which applications were active in a time period preceding originating the call to the advertising phone number.

18. The method of claim 13, wherein the second message is sent in accordance with a policy selected from the group of policies consisting of:

periodically at a predetermined interval;

periodically at a predetermined interval, provided at least one call-through event has been detected;

after a predetermined number of call-through events have been detected; and in response to a request.

19. The method of claim 12 comprising:

processing the received call-through event information; and providing the processed call-through event information to an advertising entity.

* * * * *